Patented Oct. 14, 1952

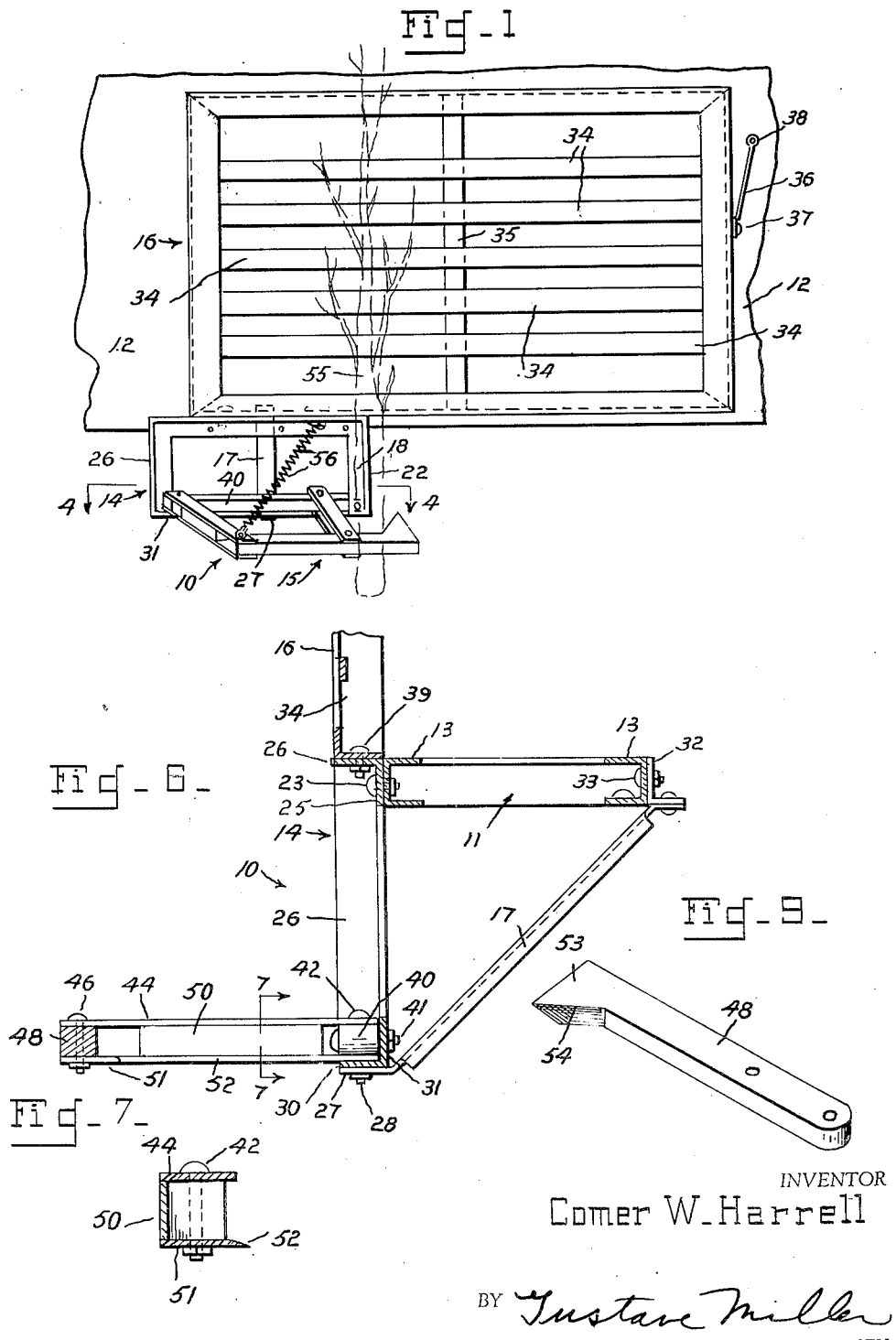

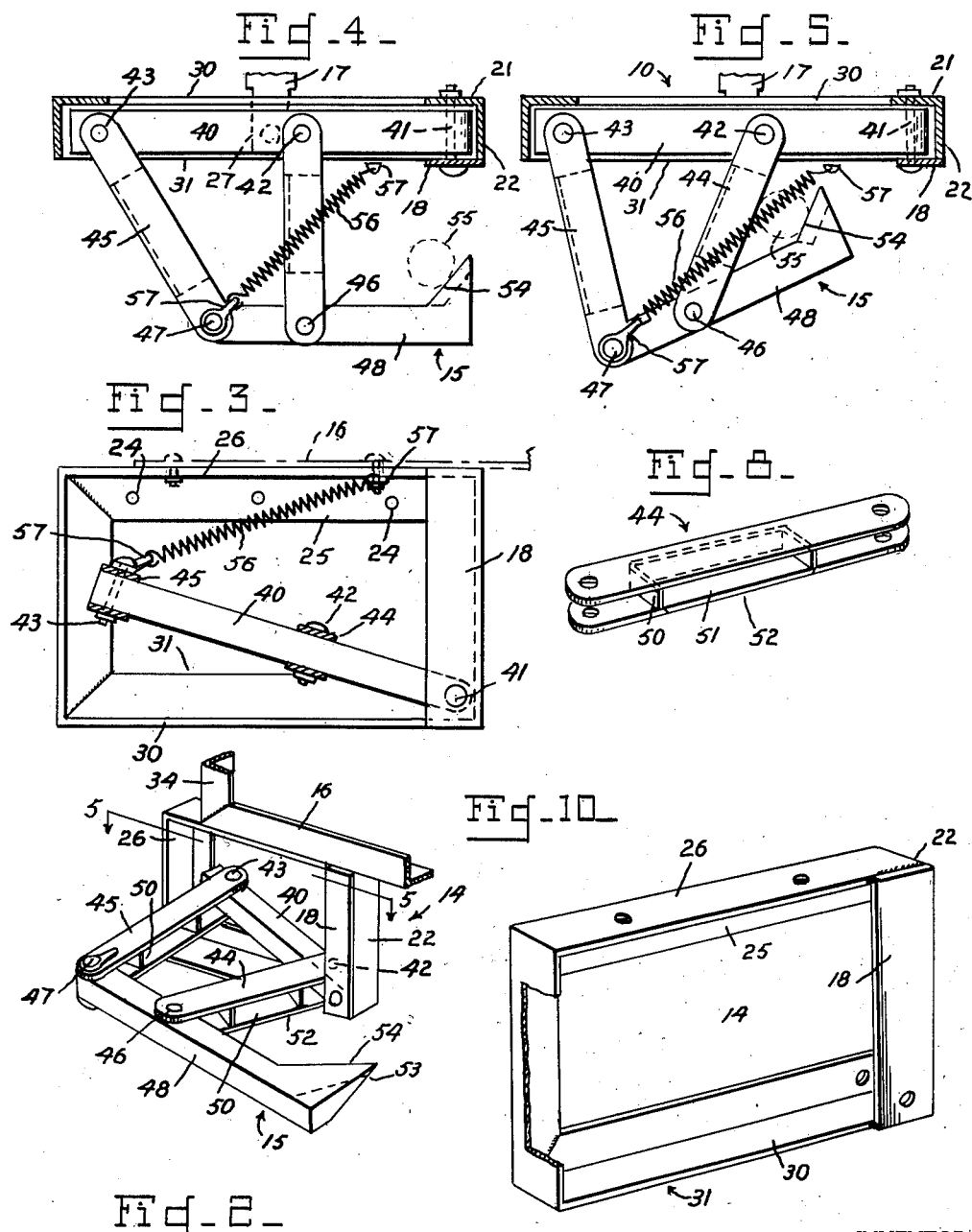

2,613,458

UNITED STATES PATENT OFFICE 2,613,458

TREE PULLER

Comer W. Harrell, Bainbridge, Ga.

Application April 16, 1951, Serial No. 221,193

4 Claims. (Cl. 37—2)

This invention relates to a tree puller and has for an object to provide a device adapted to be attached to a farm tractor, truck or the like and is used for the purpose of removing trees and large bushes from land which is being cleared for new ground or pasture.

The primary object of this invention is to provide a tree or bush puller attachment for tractors adapted for use in clearing trees, scrub growth, underbrush, bushes, etc. from all kinds of terrain, and which needs only a single operator, the operator being the driver of the tractor or truck to which the tree puller of this invention has been attached.

A further object of this invention is to provide a tree puller attachment for tractors or trucks which will automatically engage and pull trees, bushes, or the like, from the ground when the tractor is driven in the proper direction and then after the roots have been pulled from the ground, the tree, bushes, or the like may be disengaged automatically from the puller by merely backing up the truck or tractor a slight amount, making the tree puller ready for operation on the next tree or bush to be pulled and cleared from the ground. It is thus possible for the tractor operator to remain in the driver position on the tractor and operate continuously to clear a much larger area of ground in the same time than is possible with any conventional method of clearing trees and bushes from the ground.

A further object of this invention is to provide a tree puller attachment for a tractor which may be so mounted on a tractor in front of the rear wheels that operation of the tree puller exerts a down pressure on the tractor thus causing the rear wheels of the tractor to have more traction and giving the tractor more pulling power.

A further object of this invention is to provide a tree-puller attachment to a vehicle which is self-engaging on the tree or bush being pulled and which hinges automatically to allow the tree or bush to lean forward as its is being pulled, thereby eliminating twisting and binding action on the tree puller and which, after the tree or bush has been pulled from the ground, may be disengaged therefrom by merely backing up the tractor a slight amount.

A further object of this invention is to provide a tree puller attachment which is of sturdy construction and may be readily yet firmly attached to the tractor or vehicle on which it is to be mounted.

Still a further object of this invention is to provide a protector grill arranged to be supported on the frame of the tree puller and braced to the tractor in such a manner as to protect the side of the tractor or vehicle from the trunk or branches of the trees or bushes being pulled.

With the foregoing and other objects in view, this invention comprises the combination, construction and arrangement of parts hereinafter set forth, claimed and disclosed in the accompanying drawings, wherein:

Fig. 1 is a perspective view of the tree puller and protective grill of this invention attached to the side of a tractor;

Fig. 2 is a perspective view of the tree puller per se being in tree pulling position, the spring being omitted;

Fig. 3 is a sectional view of Fig. 5 taken on a line behind the grab beam looking toward the frame;

Fig. 4 is a view on line 4—4 of Fig. 1;

Fig. 5 is a view on line 5—5 of Fig. 2;

Fig. 6 is a sectional view across a tractor chassis showing the tree puller attached thereto, the spring being omitted;

Fig. 7 is a sectional view on line 7—7 of Fig. 6;

Fig. 8 is a perspective view of the forward cross beam;

Fig. 9 is a perspective view of the grab arm; and

Fig. 10 is a perspective view of the puller frame.

There is shown at 10 the tree puller attachment of this invention which may be mounted on the chassis frame 11 of a tractor or vehicle 12. The tree puller 10 consists principally of a rectangular frame 14, a tree grabbing device 15 pivotally hinged thereto, a vehicle protective grill 16 supported principally on the top of the frame 14 and brace means 17 to assist in securing the frame 14 to the chassis or vehicle frame 11.

The tree puller frame 14 consists of four heavy angle bars welded or otherwise secured together in a rectangular frame, the horizontal bars being about eighteen inches long and the vertical bars being about twelve inches high. Secured as by welding to the front vertical angle bar of frame 14 is an iron plate 18 extending parallel to the rear arm 21 of the forward vertical angle bar 22. The frame 14 is mounted on a tractor or vehicle by means of bolts and nuts 23 extending through suitably spaced holes 24 in the rear leg 25 of the upper angle bar 26 of frame 14, the bolts 23 being secured to one of the chassis frame members 13. The lower end of frame 14 has a projecting tongue 27 from brace member 17 secured by a bolt and nut 28 to the bottom leg 30 of the lower angle bar 31 of frame 14. The other end of brace 17 is attached to an angle bar support 32 which in turn is bolted at 33 to the opposite chassis frame member 13, thus rigidly yet detachably securing frame member 14 to the vehicle chassis frame 11.

The vehicle tree protector grill 16 consists of four angle bar members welded together at their corners to provide a rectangular frame and a plurality of horizontal bars 34 welded to the vertical angle bars of the grill 16 and then reinforced by a vertical bar 35 extending back of the bars 34 and welded thereto and to the top and bottom angle bars of the grill frame 16. A brace arm 36 is bolted at 37 to one end of the grill 16 and is provided with a bolt 38 for securing its other end to the side of the vehicle or tractor 12. The grill 16 is mounted on the puller frame 14 by means of two bolts 39 extending through the lower leg of the lower horizontal bar of grill frame 16 and the upper leg of the upper horizontal bar 26 of the puller frame 14.

The tree grabbing device 15 consists of the tongue 40 which is pivotally hinged on the bolt 41 which extends through the lower portion of the plate 18 and the rear leg 21 of the front angle bar 22 of frame 14. The width of tongue 40 is slightly less than the space between leg 21 and plate 18, thereby permitting tongue 40 to hinge rearwardly up or down within the limits of the frame 14, the tongue 40 being slightly less in length than the length of the frame 14. Pivotally secured on the tongue 40 by vertically extending bolts 42 and 43 are the forward cross arm 44 and the rearward cross arm 45, the other ends of the cross arms 44 and 45 being pivotally bolted at 46 and 47 to the grab beam 48. Each of these cross arms may consist of an upper and a lower iron plate welded together and reinforced by means of a U member 50. The lower plate 51 of the forward cross arm 44 is sharpened to an edge 52 to assist it in biting into the tree or bush being pulled.

The grab beam 48 is provided at its forward end with an inwardly extending sharpened triangular grabbing point 53 having an upper sharpened edge 54 which will cut into and grab the opposite side of the tree 55 being pulled. It will be noted that the pivot bolts 42 and 43 at the tongue end of the cross arms 44 and 45 are spaced apart a greater distance than the pivot bolts 46 and 47 on the grab beam end of these cross arms 44 and 45. Furtherfore, the forward cross arm 44 is slightly shorter than the rear cross arm 45, in one embodiment, the forward cross arm 44 being twelve inches long while the rear cross arm 45 is thirteen-and-a-half inches long. A spring 56 of suitable strength extends between the pivot bolt 47 at the rear of the grab beam 48 and the forward grill supporting bolt 39, being secured to each bolt by suitable ear lugs 57. The strength of the spring 56 is such that it tends to pull in the rear end of grab beam 48 so that when no force is exerted thereon, the front end, that is the grab point 53 and grab edge 54, remains a maximum distance from frame 14. However, the strength of spring 56 is not sufficient to pivot the tree grabbing device 15 upwardly about its hinge bolt 41, the weight of this tree grabbing device 15 being too great therefor. In operation, the frame 14 is secured to the vehicle chassis and braced thereon as described, the tree protecting grill being likewise secured thereon if desired, although, of course, the invention would be operative in the absence of this grill 16. The vehicle operator then merely manipulates his vehicle 12 so as to bring the tree or bush being pulled between the point 53 of grab beam 48 and the vehicle. Then by merely driving the vehicle forward slowly, the tree 55 will come into contact with the forward cross beam 44. The forward movement of the vehicle will then cause the tree 55 to push against the forward cross beam 44, thus causing the grab beam 48 to pivot inwardly and contact its grabbing edge 54 to the opposite or forward side of the tree 55. Then as the vehicle continues forward, the tree will tend to lean over as the sharpened edge 52 of cross arm 44 engages it and causes it to be gripped thereagainst by the grab beam sharpened edge 54. As the tree leans over, the tree grabbing device 15 as a whole will hinge upwardly about the tongue bolt 41 thus preventing any serious twisting strain thereon. The leaning action of the tree will be limited by the rear end of tongue 40 coming into contact with the upper leg of the upper angle bar 25 of puller frame 14. The tree 55 will thus be pulled from the ground as the vehicle continues forwardly, the resistance of the tree to being pulled tending to force the rear wheels of the vehicle downwardly into better traction with the ground. After the tree has been pulled free of the ground, the bottom end of the tree will be still dragging on the ground. The vehicle will then be stopped and backed up approximately two feet which will serve to permit the spring 56 to pivot the grab beam 48 out of contact with the side of the tree 55 thus permitting it to fall to the ground and disengaging itself from the tree grabbing device 15. The operator of the vehicle then may continue on to pull another tree without having had to get out of his vehicle whatsoever. He may thus clear a great deal of ground remaining at the driving wheel of the vehicle and by manipulating the vehicle to pull trees, disengage the pulled trees from the vehicle and then continue on.

While the device has been shown and the structure described in detail, it is obvious that this invention is not to be considered as being limited to the exact form disclosed, and that changes in detail and construction may be made therein within the scope of what is claimed, without departing from the spirit of this invention.

I claim:

1. A tree puller comprising an upright frame arranged to be attached to a side of a vehicle, a tree grabbing device hingedly secured to said frame for pivotal movement about a horizontal axis, said tree grabbing device comprising a tongue, said tongue being pivoted at its forward end to a forward portion of said frame on a horizontal pivoting axis whereby the rear end of said tongue may hinge upwardly, a pair of cross beams each pivoted at one end to said tongue, one of said cross beams being pivoted adjacent the hinge end of said tongue, and the other of said cross beams being pivoted adjacent the opposite end of said tongue, a tree grab beam, the other ends of said cross beams being pivoted to said grab beam, said cross beam pivots extending vertically, said cross beam pivots on said grab beam being spaced closer together than said cross beam pivots on said tongue, whereby contact of said forward cross beam with the tree to be pulled will cause a projecting forward end of said grab beam to pivot inwardly into contact with the forward side of the tree.

2. A tree puller comprising an upright frame arranged to be attached to a side of a vehicle, a tree grabbing device hingedly secured to said frame for pivotal movement about a horizontal axis, said tree grabbing device comprising a tongue, said tongue being pivoted at its forward end to a forward portion of said frame on a horizontal pivoting axis whereby the rear end of said tongue may hinge upwardly, a pair of cross beams each pivoted at one end to said tongue, one of said cross beams being pivoted adjacent the hinge end of said tongue, and the other of said cross beams being pivoted adjacent the opposite end of said tongue, a tree grab beam, the other ends of said cross beams being pivoted to said grab beam, said cross beam pivots extending vertically, said cross beam pivots on said grab beam being spaced closer together than said cross beam pivots on said tongue, whereby contact of said forward cross beam with the tree to be pulled will cause a projecting forward end of said grab beam to pivot inwardly into contact with the forward side of the tree, and a sharpened inwardly projecting edge on said forwardly projecting portion of said grab beam, said forward cross beam having a sharpened under edge thereon.

3. A tree puller attachment for tractors or other vehicles comprising a rectangular frame arranged to be bolted adjacent its top to an adjacent chassis member of the vhicle, a brace member arranged to be bolted to a bottom portion of said frame and to extend under the vehicle and be bolted to the opposite chassis member of the vehicle, and a tree grabbing device hingedly secured on a horizontal axis to said tree puller frame, said tree grabbing device comprising a tongue, a horizontal pivot bolt extending through said tongue to said tree puller frame, a pair of transversely extending cross arms pivoted to said tongue on vertical pivots, said vertical pivots being adjacent opposite ends of said tongue, and a grab beam pivoted to the opposite ends of said cross arms on vertical pivots to said grab beam, said grab beam vertical pivots being spaced closer than said tongue vertical pivots, said grab beam extending forwardly of said cross arms and having an inwardly extending grabbing edge secured thereon, said grabbing edge being sharpened along its upper edge, said forward cross arm being sharpened along its lower edge, and yieldable means urging said tree grabbing device to tree disengaging position, said forward cross arm when contacted by a tree pivoting its outer end inwardly thereby pivoting the projecting end of said grab beam inwardly against the forward surface of said tree to grab the tree and pull the same, said tree grabbing device hinging upwardly to allow the tree to lean over as it is pulled and to disengage said tree under force of said yieldable means as the vehicle is backed up.

4. A tree puller attachment for tractors or other vehicles comprising a rectangular frame arranged to be bolted adjacent its top to an adjacent chassis member of the vehicle, a brace member arranged to be bolted to a bottom portion of said frame and to extend under the vehicle and be bolted to the opposite chassis member of the vhicle, and a tree grabbing device hingedly secured on a horizontal axis to said tree puller frame, said tree grabbing device comprising a tongue, a horizontal pivot bolt extending through said tongue to said tree puller frame, a pair of transversely extending cross arms pivoted to said tongue on vertical pivots, said vertical pivots being adjacent opposite ends of said tongue, and a grab beam pivoted to the opposite ends of said cross arms on vertical pivots to said grab beam, said grab beam vertical pivots being spaced closer than said tongue vertical pivots, said grab beam extending forwardly of said cross arms and having an inwardly extending grabbing edge secured thereon, said grabbing edge being sharpened along its upper edge, said forward cross arm being sharpened along its lower edge, and yieldable means urging said tree grabbing device to tree disengaging position, said forward cross arm when contacted by a tree pivoting its outer end inwardly thereby pivoting the projecting end of said grab beam inwardly against the forward surface of said tree to grab the tree and pull the same, said tree grabbing device hinging upwardly to allow the tree to lean over as it is pulled and to disengage said tree under force of said yieldable means as the vehicle is backed up, said yieldable means comprising a spring secured at one end adjacent an upper forward end of said tree puller frame and at its other end adjacent the rear pivot on said grab arm.

COMER W. HARRELL.

REFERENCES CITED

The following references are of record in the file of this patent:

UNITED STATES PATENTS

| Number | Name | Date |
|---|---|---|
| 2,441,132 | Blakey | May 11, 1948 |
| 2,505,923 | Taylor et al. | May 2, 1950 |